United States Patent [19]

Krener et al.

[11] 4,192,415
[45] Mar. 11, 1980

[54] APPARATUS FOR TRANSFERRING FROZEN CONFECTIONS FROM A SUPPLY CONVEYOR TO A DISCHARGE CONVEYOR

[75] Inventors: Ole G. Krener, Hojbjerg; Ejvind Waldstrom, Beder, both of Denmark

[73] Assignee: O.G. Hoyer A/S, Hojbjerg, Denmark

[21] Appl. No.: 893,411

[22] Filed: Apr. 4, 1978

[30] Foreign Application Priority Data

Apr. 14, 1977 [DK] Denmark .............................. 1667/77

[51] Int. Cl.² .............................................. B65G 47/24
[52] U.S. Cl. ...................................... 198/374; 53/143; 198/441
[58] Field of Search ............... 198/440, 441, 447, 450, 198/436, 374, 803, 448, 443, 728; 53/143, 236

[56] References Cited
U.S. PATENT DOCUMENTS

| 1,016,432 | 2/1912 | Nolan ..................................... 53/143 |
| 2,965,217 | 12/1960 | Dommann et al. ................... 198/728 |

FOREIGN PATENT DOCUMENTS 112504 12/1968 Denmark ................................... 53/236

*Primary Examiner*—John J. Love
*Assistant Examiner*—Douglas D. Watts
*Attorney, Agent, or Firm*—Browdy and Neimark

[57] ABSTRACT

Apparatus for receiving frozen confections supplied in a single row on a supply conveyor and delivering the confections to a discharge conveyor located at a lower level. The supply conveyor overlaps a rotary turret and a movable stop provided above the turret halts every second confection arriving on the supply conveyor following which a carrier on a movable chain pushes the confections along a transverse chute down onto the discharge conveyor. The remaining confections are allowed to travel through 180° on the turret following which they are halted by a stationary stop. Carriers on a second movable chain then push each of the latter confections along a second transverse chute onto the discharge conveyor in a space between two confections delivered via the first chute and with reversed orientation. The discharge conveyor, the carrier chains and the turret move continuously and in synchronism.

8 Claims, 2 Drawing Figures

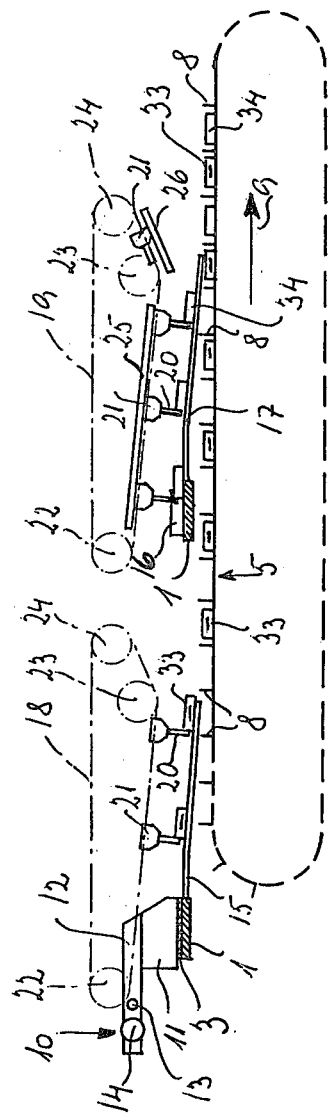

APPARATUS FOR TRANSFERRING FROZEN CONFECTIONS FROM A SUPPLY CONVEYOR TO A DISCHARGE CONVEYOR

BACKGROUND OF THE INVENTION

The present invention relates to apparatus for preparing a package containing a plurality of frozen confections, such as ice-cream bricks. More specifically it relates to apparatus for transferring frozen confections from a supply conveyor to a discharge conveyor in such a way that every other confection is rotated 180° about a vertical axis relative to the remaining confections.

It is known that the operation of assembling a plurality of frozen confections into a package can be facilitated and the volume of the package can be reduced when the confections are arranged with their holding sticks pointing alternately in opposite directions relative to the body of the respective confection. The volume reduction results in an appreciable saving of packaging material and a reduction of the space occupied by the packages during their transportation and storage, such as in a cold-storage room and/or in a retailer's shop.

As far as the inventors know, there has till now not existed any industrially applicable apparatus capable of receiving a single row of frozen confections from a production or wrapping machine and delivering the confections to a packaging station in the desired configuration mentioned above.

In Danish Patent Specification No. 112 504 there is disclosed an apparatus to which individually wrapped confections are supplied in two parallel rows with the holding sticks of the confections in either row pointing towards the other row. In the apparatus the confections are tilted on edge and pushed laterally towards each other whereby they are interleaved to form one row of closely spaced confections. Groups each including a suitable number of confections can then be transferred from the row to a package. The two preceding wrapping machines required for feeding the apparatus with two rows of confections result in an increase of the costs of the complete production plant, and continuous operation of the plant is difficult in case of a temporary stoppage of one wrapping machine.

SUMMARY OF THE INVENTION

According to the present invention there is provided apparatus for transferring frozen connfections from a supply conveyor to a discharge conveyor located at a lower level than said supply conveyor, the apparatus comprising a turret rotatable on a vertical axis and extending below said supply conveyor, means for guiding confections from said supply conveyor onto said turret along a predetermined path, first transfer means for transferring every second confection in a row of confections from said supply conveyor to said discharge conveyor said first transfer means comprising a stop located above said turret, said stop being cyclically removable into and out of the path of the confections on said turret, a first chute means associated with said movable stop and extending in the longitudinal direction of said discharge conveyor with a downward inclination from said turret towards said discharge conveyor, a first endless chain having an operative run extending above and parallel to said chute means, and carrier means on said chain for pushing confections along said chute means.

second transfer means for transferring the remaining confections from said turret to said discharge conveyor, said second transfer means comprising a stationary stop located above said turret substantially diametrically opposite said movable stop, a second chute means associated with said stationary stop and extending in the longitudinal direction of said discharge conveyor with a downward inclination from said turret towards said discharge conveyor, a second endless chain having an operative run extending above and parallel to said second chute means, and carrier means on said chain for pushing confections along said chute means, and a common drive mechanism for effecting a continuous rotation of said turret, continuous movement of said discharge conveyor and said endless chains, and a cyclical movement of said movable stop, whereby every second confection in a row of confections on said supply conveyor is halted by said stop and engaged by a carrier means on said first endless chain while the remaining confections are allowed to move on said turret for being rotated 180° before they are halted by said stationary stop.

From U.S. Pat. No. 1,016,432 there is known an apparatus for packing matches in trays, which apparatus has some general features in common with the apparatus of the present invention, viz. a supply conveyor, a discharge conveyor substantially perpendicular thereto, a rotary turret for reversing the orientation of an upper layer of matches in each tray relative to a lower layer of matches in the tray, means for transferring some matches directly from the supply conveyor to trays advanced on the discharge conveyor and means for transferring the remaining matches from the supply conveyor to the turret and from the turret to the trays.

In the turret there are formed a plurality of compartments open at their top and bottom, and the turret rotates intermittently in contact with a stationary annular bedplate which functions as a bottom wall in the compartments except in two diametrically opposed compartments above the discharge conveyor. At these locations there are openings in the bedplate which constitute match delivery ports, and cooperating shutters for opening and closing the ports by a reciprocating movement.

Oriented matches are fed continuously on the supply connveyor from which they slide along a stationary chute into that one of said two compartments which is adjacent the supply conveyor. During each standstill of the turret the shutters are retracted and subsequently advanced to close the match delivery ports when approximately one half of the matches in said one compartment have fallen directly into a subjacent tray on the discharge conveyor, while the remainder of the matches fall from the compartment into a tray through the opposed match delivery port after having rotated 180° on the turret so that their orientation has been reversed.

In the apparatus of the present invention the continuous movements of the turret and the discharge conveyor permit a simplified design of the drive mechanism of the apparatus and a high throughput with substantially no dynamic loads acting on its component parts. In practice the apparatus has operated satisfactorily and without problems at a throughput of up to 15,000 frozen confections per hour. The transfer of the confections to the discharge conveyor by means of the synchronized carrier chains ensures that even at highspeed operation the confections are delivered to the discharge conveyor with the correct mutual spacing irrespective of possible minor inaccuracies in the location of the confections on the supply conveyor and/or the turret. Such inaccuracies are further neutralized to a substantial extent by the stationary stop which halts the confections arriving on the turret, and by the movable stop which in timed relationship, with the rotation of the turret and the movement of the discharge conveyor obstructs the path of movement of every second confection, whereas it has cleared that path each time one of the remaining confections arrives on the supply conveyor. Because the supply conveyor overlies the turret, those confections, which shall be reversed by means of the turret, slide directly onto the turret without first moving along a stationary surface which could cause on uncontrollable deceleration of the confections due to friction and thus result in major deviations from their desired mutual location on the turret. The exact mutual location of the confections at their delivery to the discharge conveyor, as obtained by means of the two stops and the carrier chains, permits a very simple design of the turret in the form of a plain anular support surface without any means for guiding or pushing the confections thereon.

In order to minimize the risk of an inexact transfer of confections from the supply conveyor to the turret the conveyor may be a thin belt which is directly supported by the turret in the area where the conveyor overlaps the turret.

The means for guiding the confections from the supply conveyor onto the turret may comprise a stationary guide plate extending along the outer circumference of said turret where the supply conveyor overlaps the turret.

The movable stop may be movable in a vertical plane in which case its movement can be relatively short corresponding only to the thickness or vertical dimension of the confections.

The two stops may be adjustable transversely of the longitudinal direction of the discharge conveyor. By adjusting the positions of the stops in that direction, it is possible to alter the degree of transverse overlap or interleaving of the confections on the discharge conveyor, and in most cases to obtain that further means for pushing the confections closer together, such as stationary rails along the discharge conveyor, are unnecessary.

The carriers may be hinged to the respective chain and there may be provided means for preventing the carriers from pivoting on their hinges when they move through the active run of the respective chain, and a stationary abutment provided at the termination of each said active run for pivoting the carriers in a backward direction. This eliminates the tendency for a carrier to lift a confection at the moment of transfer to the discharge conveyor and at the same time impart an undesired forward acceleration to the confection, which might occur if the carriers were rigidly mounted on a chain which at the termination of its active run is trained over a sprocket above the conveyor.

BRIEF DESCRIPTION OF THE DRAWINGS

The invention will now be described in more detail with reference to the accompanying drawings in which FIG. 2 is a simplified vertical section on line II—II of FIG. 1.

Figure 1:
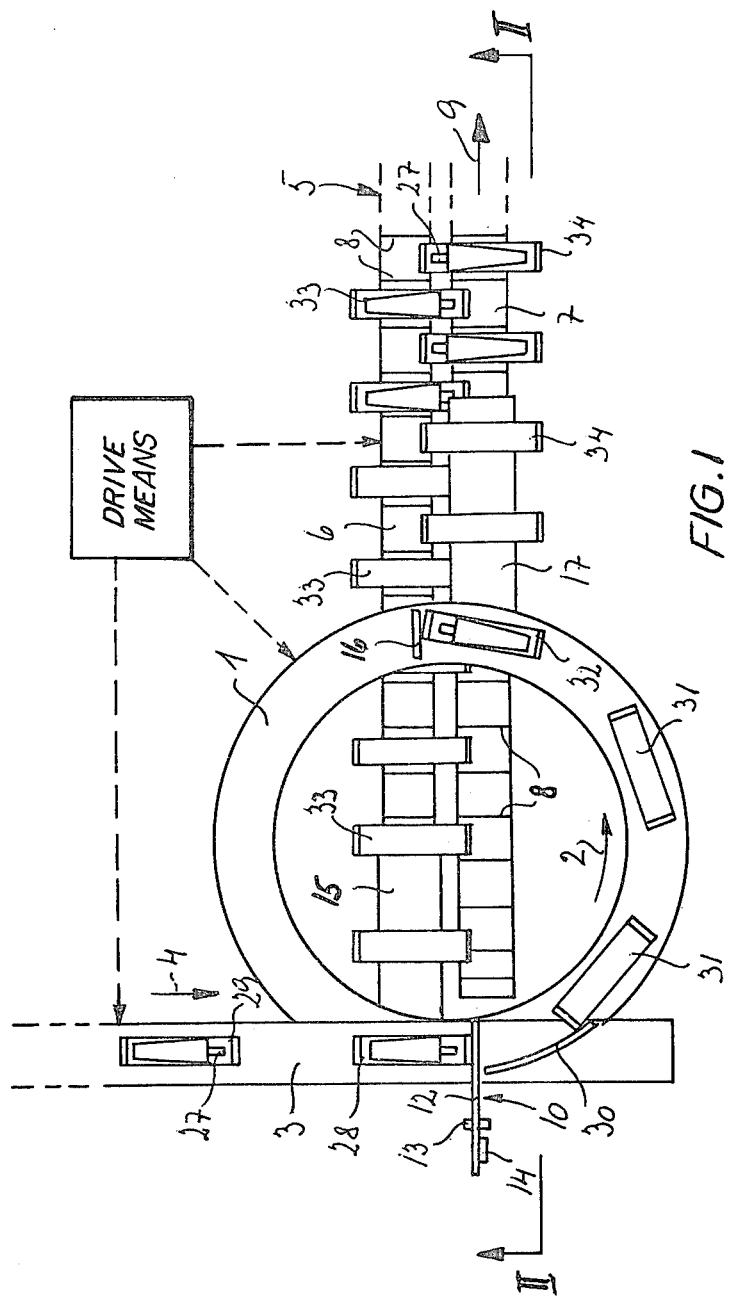
FIG. 1 is a simplified plan view from above of an apparatus embodying the invention.

For the sake of clarity several parts of the apparatus, the showing of which is deemed unnecessary for the understanding of the invention, and which may be of conventional design, have been omitted in each view of the drawings. Such omitted parts include a frame on which the various component parts of the apparatus are mounted.

DETAILED DESCRIPTION

As shown the apparatus comprises a rotary turret 1 with an annular upper surface of a material having a suitable coefficient of friction so that frozen confections supported by the surface participate in the rotation of the turret without needing any drivers or carriers. The turret is journalled on a vertical axis in the frame (not shown) of the apparatus, and it is rotated by a drive mechanism (not shown) in the direction of arrow 2 and at a constant speed. A supply conveyor 3 extends tangentially above and beyond the turret 1 at the left-hand side thereof as seen in FIG. 1, and may be directly supported by the turret 1 in the area where the conveyor 3 overlaps the turret 1 (as shown in FIG. 2). Conveyor 3 is preferably a thin belt of flexible material, such as a plastic film, which also has a suitable coefficient of friction. Outside the turret the belt may be supported in such a way that its upper surface is slightly concave in the transverse direction whereby the advancing confections are located midway between the edges of the belt. Conveyor 3 moves continuously in the direction of arrow 4, and as shown its linear speed is approximately twice the peripheral speed of turret 1. A discharge conveyor 5 extends below turret 1 and perpendicular to supply conveyor 3, and it comprises two parallel, mechanically connected belts 6 and 7 from which equispaced partitions 8 extend outwardly. Partitions 8 are aligned in pairs, as shown in FIG. 1, and between each pair of successive partitions there is formed an upwardly open pocket or compartment for receiving a frozen confection. Conveyor 5 is driven continuously in the direction of arrow 9.

Where supply conveyor 3 overlaps turret 1 there is provided a movable stop 10 comprising a vertical plate 11 which in its operative position shown in FIG. 2 engages the upper surface of conveyor 3. Plate 11 is secured to a lever 12 pivotally supported by a horizontal shaft 13 and carrying a roller 14 cooperating with a rotary cam (not shown) which alternately lifts plate 11 to an inoperative position in which a frozen confection can pass freely below the plate, and lowers the plate to its operative position as shown. Associated with stop 10 is a stationary plate or chute 15 extending from the inner edge of turret 1 in the direction of arrow 9 and terminating above belt 6, the chute 15 being preferably inclined as shown in FIG. 2.

Generally diametrically opposite the stop 10 is provided a stationary stop 16 above turret 1, and associated with stop 16 is a second stationary chute 17, also preferably inclined as shown in FIG. 2, extending in the direction of arrow 9 from the outer edge of turret 1 and terminating above conveyor belt 7.

Above each of chutes 15 and 17 (See FIG. 2) there is provided an endless chain 18 and 19, respectively, and each chain carries a plurality of drivers or carriers 20 which are hingedly connected with the respective chain by means of feet 21. Each chain is trained over three sprockets 22, 23, and 24, one of which is driven continuously such that the chains move in synchronism with discharge conveyor 5. On the active run of each chain between sprockets 22 and 23 its carriers 20 move substantially in parallel with the associated chute and in the direction of arrow 9.

Along said active run of each chain 18 or 19 there is a stationary guide bar 25 (for purposes of simplicity illustrated in FIG. 2 only for chain 19) which engages the feet 21 of carriers 20 so that the carriers are held perpendicular to the chain. Between sprockets 23 and 24 there is a stationary deflector bar 26 (also illustrated only for chain 19) which is struck by the foot 21 of each carrier when the chain enters sprocket 23 so that, as shown in FIG. 2, the carrier is pivoted upwardly and rearwardly relative to the direction in which the chain moves.

Frozen confections wrapped individually in a packaging machine (not shown) are delivered from the packaging machine in a single row to supply conveyor 3, the spacing between successive wrapped confections 28, 29 on the conveyor being determined by the delivery rate of the packaging machine and the speed of the conveyor. On conveyor 3 all confections are oriented with their holding sticks 27 pointing forward in the direction of travel as represented by arrow 4. For the sake of clarity FIG. 1 shows only some of the wrapped confections 28, 29.

FIG. 1 shows wrapped confection 28 which has just been halted by stop 10 annd which immediately after this will be engaged by a carrier 20 depending from chain 18 and be moved laterally away from conveyor 3 onto chute 15. When the wrapped confection has been caught by the carrier 20, stop 10 is lifted as explained above and, consequently, the following wrapped confection 29 continues on conveyor 3 below the stop until it engages a stationary vertical guide plate 30 located immediately above conveyor 3 and curved in accordance with the contour of turret 1. The wrapped confection is thus transferred to the turret 1 and moves together with the turret through approximately 180° until it is halted by the fixed or stationary stop 16. FIG. 1 shows two wrapped confections 31 being transported by the turret and one wrapped confection 32, which has just been halted by stop 16. It will be seen that the wrapped confection 32 has been rotated about a vertical axis such that its holding stick points in the opposite direction from the sticks in those wrapped confections 33 which were halted by stop 10 and then pushed along chute 15 by means of the carriers on chain 18.

The movements of turret 1, discharge conveyor 5 and chains 18 and 19 are synchronized such that the carriers on the respective chains deliver the wrapped confections in the pockets formed on belts 6 and 7 between successive partitions 8, and such that chain 18 delivers confections 33 into every second pocket while the remaining confections 34 are delivered into the intermediate pockets by means of the drivers on chain 19. On discharge conveyor 5 the wrapped confections 33 and 34 thus assume the configuration desirable for being transferred to a container or other package, i.e. with their holding sticks 27 extending alternately in opposite directions. From conveyor 5 the confections can be delivered to a known device which tilts them 90° so that they come to rest on their narrow faces or edges, and at the same time pushes them closely together in the direction of advance, as represented by arrow 9. It will be seen from FIG. 1 that the location of stops 10 and 16 relative to the transverse direction of conveyor 5 determines the degree of interleaving of the confections, and by suitable transverse adjustment of the stops an interleaving can be obtained which permits a very compact packaging of a plurality of confections in a box or other container or outer wrapping.

We claim:

1. Apparatus for transferring frozen confections arriving in a single row at predetermined time intervals on a supply conveyor and passing from said supply conveyor to a discharge conveyor located at a lower level than said supply conveyor, the apparatus comprising a turret rotatable on a vertical axis and extending below said supply conveyor, means for guiding confections from said supply conveyor onto said turret along a predetermined path, first transfer means for transferring every second confection in a row of confections from said supply conveyor to said discharge conveyor, said first transfer means comprising a stop located above said turret, said stop being cyclically movable into and out of the path of the confections on said turret, a first chute means associated with said movable stop and extending in the longitudinal direction of said discharge conveyor with a downward inclination from said turret towards said discharge conveyor, a first endless chain having an operative run extending above and parallel to said chute means, and carrier means on said chain for pushing confections along said chute means, second transfer means for transferring the remaining confections from said turret to said discharge conveyor, said second transfer means comprising a stationary stop located above said turret substantially diametrically opposite said movable stop, a second chute means associated with said stationary stop and extending in the longitudinal direction of said discharge conveyor with a downward inclination from said turret towards said discharge conveyor, a seconnd endless chain having an operative run extending above and parallel to said second chute means, and carrier means on said chain for pushing confections along said chute means, and a common drive mechanism for effecting a continuous rotation of said turret, continuous movement of said discharge conveyor and said endless chains, and a cyclical movement of said movable stop in timed relationship with the arrival of said confections on said supply conveyor, such that said stop is maintained in the path of said confections for a period sufficient to halt one confection until it has been engaged by a carrier means on said first endless chain, while said stop is subsequently maintained outside the path of said confections for a period sufficient to permit a confection subsequently arriving on said supply conveyor to pass clear of said movable stop.

2. Apparatus as claimed in claim 1, wherein said supply conveyor is a thin belt, which is directly supported by said turret in the area where the conveyor overlaps the turret.

3. Apparatus as claimed in claim 1, wherein said confection guiding means comprises a stationary guide plate extending along the outer circumference of said turret where the supply conveyor overlaps the turret.

4. Apparatus as claimed in claim 1, wherein said movable stop is movable in a vertical plane.

5. Apparatus as claimed in claim 1, wherein said movable stop and said stationary stop are adjustable transversely of the longitudinal direction of said discharge conveyor.

6. Apparatus as claimed in claim 1, wherein said carriers on said first and second chains are hinged to the respective chain, and further comprising means preventing said carriers from pivoting on their hinges when they move through the active run of the respective chain, and a stationary abutment provided at the termination of each said active run for pivoting said carriers in a backward direction.

7. Apparatus in accordance with claim 1, wherein said stop for said first transfer means which is cyclically movable into and out of the path of the confections on said turret, comprises a means to move said stop transversely of the path of the confections.

8. Apparatus for transferring articles—which are non-symmetrical about a transverse axis—arriving in a single row at predetermined intervals on a continuously moving supply conveyor, and transferring the articles from the supply conveyor to a discharge conveyor located at a level lower than that of the supply conveyor in such a way that every transferred article is oriented 180° about said transverse axis from each immediately adjacent transferred article, every second article hereinafter being designated even articles and every article immediately adjacent an even article being designated odd articles, the apparatus comprising:

a turret rotatable on a vertical axis and extending below the supply conveyor, means for guiding even articles from the conveyor onto said turret, first transfer means for transferring odd articles from the supply conveyor to the discharge conveyor, said first transfer means comprising a stop located above the supply conveyor and said turret, said stop being cyclically movable into and out of the path of the articles on the supply conveyor, a first chute means adjacent said movable stop and extending in the the longitudinal direction of the discharge conveyor, said chute means having a downward inclination from the supply conveyor toward the discharge conveyor, a first endless chain having an operative run extending above and parallel to said chute means, and means on said chain to push odd articles along said downwardly inclined chute means, second transfer means for transferring even articles from said turret to the discharge conveyor, said second transfer means comprising a stationary stop located above said turret and spaced approximately 180° from said movable stop, a second chute means adjacent said stationary stop and extending in the longitudinal direction of the discharge conveyor, said second chute means being downwardly inclined from said turret toward the discharge conveyor, a second endless chain having an operative run extending above and parallel to said second chute means, and means on said second endless chain to push even articles along said second chute means, and common driving means to effect continuous rotation of said turret, continuous movement of the discharge conveyor and said endless chains, and the cyclical movement of said movable stop in timed relationship with the arrival of articles on the supply conveyor, said common drive means including control means to maintain said movable stop in the path of articles for a period sufficient to halt an odd article until it is engaged by said first transfer means, and then to actuate said movable stop so that the next adjacent even article passes 180° around said turret to be engaged by said second transfer means.

* * * * *